(12) United States Patent
Yang et al.

(10) Patent No.: US 10,540,018 B2
(45) Date of Patent: Jan. 21, 2020

(54) SYSTEMS AND METHODS FOR MULTILINGUAL EMOJI SEARCH

(71) Applicant: Facebook, Inc., Menlo Park, CA (US)

(72) Inventors: Conghui Yang, San Mateo, CA (US); Aliasgar Mumtaz Husain, Milpitas, CA (US)

(73) Assignee: Facebook, Inc., Menlo Park, CA (US)

( * ) Notice: Subject to any disclaimer, the term of this patent is extended or adjusted under 35 U.S.C. 154(b) by 104 days.

(21) Appl. No.: 15/613,973

(22) Filed: Jun. 5, 2017

(65) Prior Publication Data

US 2018/0348890 A1 Dec. 6, 2018

(51) Int. Cl.
*G06F 17/27* (2006.01)
*G06F 3/023* (2006.01)
*H04L 12/58* (2006.01)
*G06N 20/00* (2019.01)

(52) U.S. Cl.
CPC .......... *G06F 3/0237* (2013.01); *G06F 3/0236* (2013.01); *G06N 20/00* (2019.01); *H04L 51/046* (2013.01)

(58) Field of Classification Search
CPC ...................................................... G06F 17/28
USPC ........................................................ 704/2–8
See application file for complete search history.

(56) References Cited

U.S. PATENT DOCUMENTS

| 2014/0288917 | A1* | 9/2014 | Orsini | G06F 17/2854 704/2 |
| 2017/0083493 | A1* | 3/2017 | Kumhyr | G06F 17/24 |
| 2017/0185580 | A1* | 6/2017 | Zhang | G06F 17/276 |
| 2017/0185581 | A1* | 6/2017 | Bojja | G06F 17/24 |

OTHER PUBLICATIONS

Barbieri et al. "How Cosmopolitan Are Emojis?: Exploring Emojis Usage and Meaning over Different Languages with Distributional Semantics". Proceedings of the 24th ACM International Conference on Multimedia, pp. 531-535, Amsterdam, Oct. 15-19, 2016. (Year: 2016).*
MacStories. www.macstories.net/stories/ios-10-the-macstories-review/26/, accessed Oct. 14, 2016. (Year: 2016).*

* cited by examiner

*Primary Examiner* — Jesse S Pullias
(74) *Attorney, Agent, or Firm* — Sheppard Mullin Richter & Hampton LLP

(57) ABSTRACT

Systems, methods, and non-transitory computer readable media are configured to receive emoji query text. The emoji query text can be in a first language. One or more emojis that satisfy the query text can be returned. The one or more emojis can include at least one emoji which corresponds to a second language different than the first language. Factor values of one or more factors can be calculated. The calculation can be for each of the one or more emojis. Some or all of the one or more emojis can be provided for presentation. The presentation can be based on a ranking of the one or more emojis.

20 Claims, 8 Drawing Sheets

SYSTEMS AND METHODS FOR MULTILINGUAL EMOJI SEARCH

FIELD OF THE INVENTION

The present technology relates to the field of search. More particularly, the present technology relates to techniques for multilingual emoji search.

BACKGROUND

Users often employ computing devices for a wide variety of purposes. For example, users of a social networking system can use their computing devices to interact with one another, access content, share content, and create content. In interacting with one another, the users can make use of emojis. For instance, emojis can be used in timeline posts and in messages. By using emojis in connection with text, a user can ascribe sentiment to the text. Further, emojis can be used in a standalone manner to express ideas nonverbally. A plurality of emojis can be available to a user. The user can often be able to employ search functionality to choose a desired emoji from the available emojis.

SUMMARY

Various embodiments of the present disclosure can include systems, methods, and non-transitory computer readable media configured to receive emoji query text. The emoji query text can be in a first language. One or more emojis that satisfy the query text can be returned. The one or more emojis can include at least one emoji which corresponds to a second language different than the first language. Factor values of one or more factors can be calculated. The calculation can be for each of the one or more emojis. Some or all of the one or more emojis can be provided for presentation. The presentation can be based on a ranking of the one or more emojis.

In an embodiment, the ranking can be based on the factor values.

In an embodiment, the factor values for each of the one or more emojis can be provided to a machine learning model. Also, a likelihood of user selection of the emoji can be received from the machine learning model.

In an embodiment, the ranking can be based on likelihoods of user selection of the one or more emojis.

In an embodiment, user selection of one of the one or more emojis can be received. Also, the machine learning model can be trained based on the user selection.

In an embodiment, the one or more factors include a language correlation factor. Also, a value of the language correlation factor calculated for an emoji of the one or more emojis can be based on a level of language prominence of a language to which the emoji corresponds relative to default languages of one or more social network connections of the user.

In an embodiment, the one or more factors can include an interaction history factor. Also, a value of the interaction history factor calculated for an emoji of the one or more emojis can quantify an extent to which a user has sent or received the emoji.

In an embodiment, the one or more factors can include a translation quality factor. Also, a value of the translation quality factor calculated for an emoji of the one or more emojis can be based on an extent to which one or more words of the emoji query text have direct equivalent words in a language to which the emoji corresponds.

In an embodiment, returning the one or more emojis can comprise performing a query against an emoji pool which corresponds to the second language, and performing a query against an emoji pool which corresponds to a third language.

In an embodiment, text labels of the one or more emojis satisfy the query text.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
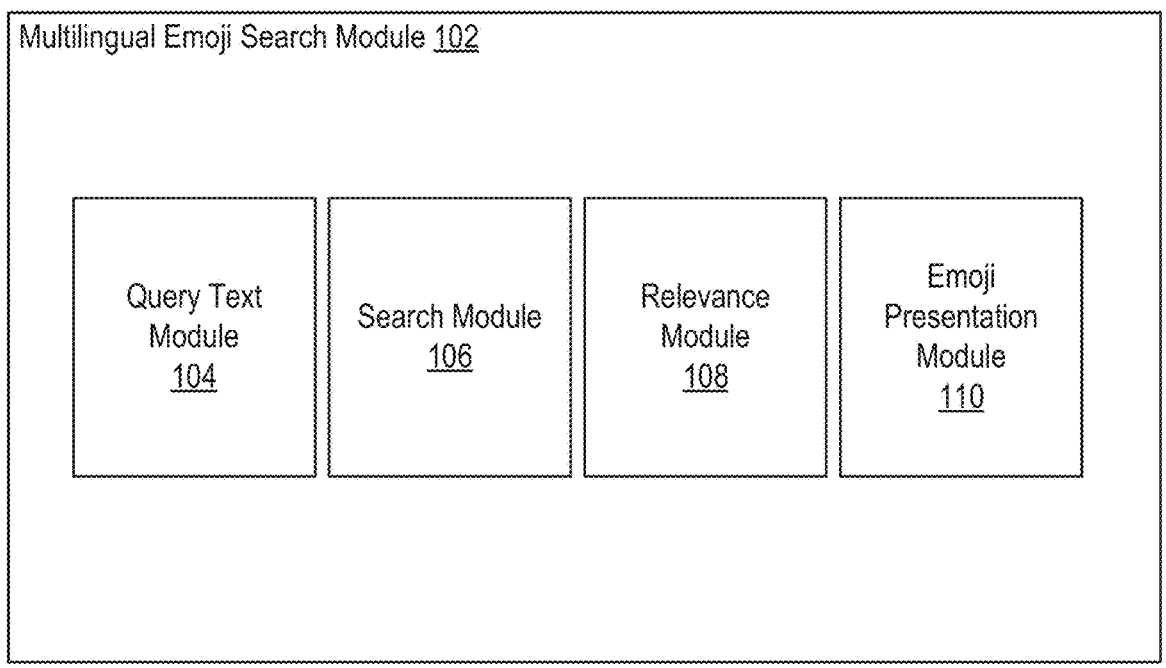
FIG. 1 illustrates an example system including an example multilingual emoji search module, according to an embodiment of the present disclosure.
Figure 1:
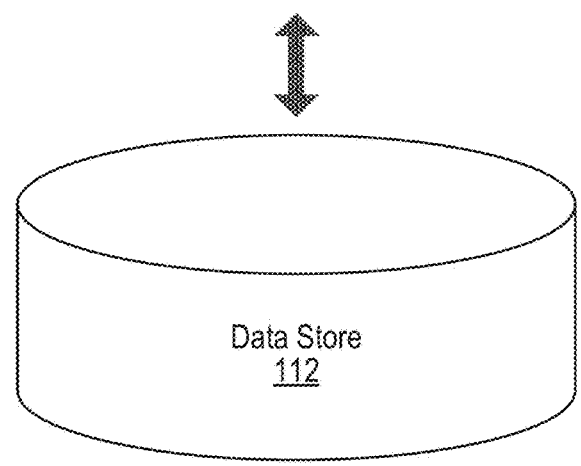

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Multilingual Emoji Search

Users often employ computing devices for a wide variety of purposes. For example, users of a social networking system can use their computing devices to interact with one another, access content, share content, and create content. In interacting with one another, the users can make use of emojis. For instance, emojis can be used in timeline posts and in messages. By using emojis in connection with text, a user can ascribe sentiment to the text. Further, emojis can be used in a standalone manner to express ideas nonverbally. A plurality of emojis can be available to a user. The user can often be able to employ search functionality to choose a desired emoji from the available emojis.

An emoji can have a corresponding original language. As one example, an emoji can have an original language of German. As another example, an emoji can have an original language of English. Many other possibilities exist. As one example, metadata of an emoji can include a text label. A language in which the text label is penned can be considered an original language of the emoji.

A user searching for an emoji typically provides query text. As just one example, the user might provide an English word "horse" as the query text. In response, a search process can act to find emojis which match the query text. The search process usually seeks emojis having a text label which achieves a desired degree of match with the query text. In the example, the search process can return emojis having text labels which achieve a desired degree of match with the word "horse."

In a search for emojis, a language through which query text is entered can constrain the emojis which are returned by the search. Continuing with the example, German words for "horse" include "Pferd" and "Ross." As a result, an emoji having an original language of German and depicting a horse might have a text label including either or both of "Pferd" and "Ross." Having provided English word "horse" as the query text, the emoji having the original language of German would not typically be among emojis returned to the user in response to the query. Even though the emoji depicts a horse, the user would not be informed of the emoji. As such, the user would suffer from not being made aware of the full array of relevant emojis.

Due to these or other concerns, conventional approaches can be disadvantageous or problematic. Therefore, an improved approach can be beneficial for addressing or alleviating various drawbacks associated with conventional approaches. Based on computer technology, the disclosed technology can allow a user to search for emojis, but not be limited to receiving only emojis having an original language matching a language of the query text. In some embodiments, a communication platform, such as a social networking system, can make emojis available to users. A user of the social networking system can desire to search for an emoji. The user can make use of a user computing device to enter query text. The query text can be in a particular language. The emojis available to users of the social networking system can each have a corresponding original language. The social networking system can utilize automated translation to translate the query text into languages other than the original language. Subsequently, the social networking system can perform a query, such as a Boolean query, for the query text with respect to the emojis available to users of the social networking system. The query can use the automated translations. The query can return a collection of emojis.

The social networking system can calculate for each emoji in a collection a plurality of factor values. The social networking system can provide, as inputs to a machine learning model, the factor values which were calculated for the emoji. The machine learning model can return a predicted likelihood that the user will select the emoji. The social networking system can utilize the factor values which were calculated for the emoji, and the predicted likelihood, in calculating a weighted score for the emoji. Subsequently, the social networking system can rank the emojis of the collection of emojis based on the weighted scores.

Then, the emojis of the collection of emojis can be presented to the user. The presentation can order the emojis of the collection of emojis based on the calculated weighted scores. The user can select one of the emojis of the collection of emojis. The selected emoji can be used within the social networking system. The machine learning model can be trained further in view of the selection by the user. More details regarding the discussed technology are provided herein.

FIG. 1 illustrates an example system 100 including an example multilingual emoji search module 102 configured to facilitate multilingual emoji search, according to an embodiment of the present disclosure. As discussed herein, emojis can include emojis, stickers, GIFs (e.g., animated Graphics Interchange Format files), and the like. Moreover, while the present disclosure may expressly discuss emojis in some embodiments, the present disclosure can equally apply to images or videos in other embodiments. As shown in the example of FIG. 1, the multilingual emoji search module 102 can include a query text module 104, a search module 106, a relevance module 108, and an emoji presentation module 110. In some instances, the example system 100 can include at least one data store 112. The components (e.g., modules, elements, etc.) shown in this figure and all figures herein are exemplary only, and other implementations can include additional, fewer, integrated, or different components. Some components may not be shown so as not to obscure relevant details. In some embodiments, the multilingual emoji search module 102 can be implemented in a system, such as a social networking system. While the disclosed technology may be described herein in connection with a social networking system for illustrative purposes, the disclosed technology can be implemented in any other type of system or environment.

In some embodiments, the multilingual emoji search module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the multilingual emoji search module 102 can be implemented, in part or in whole, as software running on one or more computing devices or systems, such as on a user or client computing device. For example, the multilingual emoji search module 102 or at least a portion thereof can be implemented using one or more computing devices or systems that include one or more servers, such as network servers or cloud servers. In another example, the multilingual emoji search module 102 or at least a portion thereof can be implemented as or within an application (e.g., app), a program, an applet, or an operating system, etc., running on a user computing device or a client computing system, such as a user computing device 610 of FIG. 6. In some instances, the multilingual emoji search module 102 can, in part or in whole, be implemented within or configured to operate in conjunction with a system (or service), such as a social networking system 630 of FIG. 6. It should be understood that there can be many variations or other possibilities.

The query text module 104 can be configured to receive query text for an emoji search. The query text can be in a particular language. The query text can be entered by a user of the social networking system via a user computing device. The entry can be through a text input tool of an application supported by the social networking system and running on the user computing device.

The search module 106 can be configured to perform a query for emojis. The search module 106 can translate the query text. The translation of the query text can be used where the language of the query text differs from an original language of an emoji which is subject to the query. Additional details regarding the search module 106 are provided below with reference to FIG. 2.

The relevance module 108 can be configured to determine a rank for each emoji resulting from the query. The rank can reflect a weighted score. The relevance module 108 can determine the weighted score for a given emoji using calculated factors, and a predicted likelihood that the user will select the emoji. Additional details regarding the relevance module 108 are provided below with reference to FIG. 3.

The emoji presentation module 110 can be configured to present to the user one or more emojis found using the query text. The presentation can reflect the rankings determined by the relevance module 108. In some implementations, fewer than all of the emojis can be presented to the user. For instance, only the n highest ranking emojis can be presented. In response to the presentation of the emojis, the emoji presentation module 110 can receive a selection by the user of one of the emojis. The selection can be made by the user through, for example, an input applied to an interface presented by the user computing device. The social networking system can cause the selected emoji to appear in a manner specified by the user. In some embodiments, the selected emoji can be presented, for example, in or with a post or a message.

Figure 2:
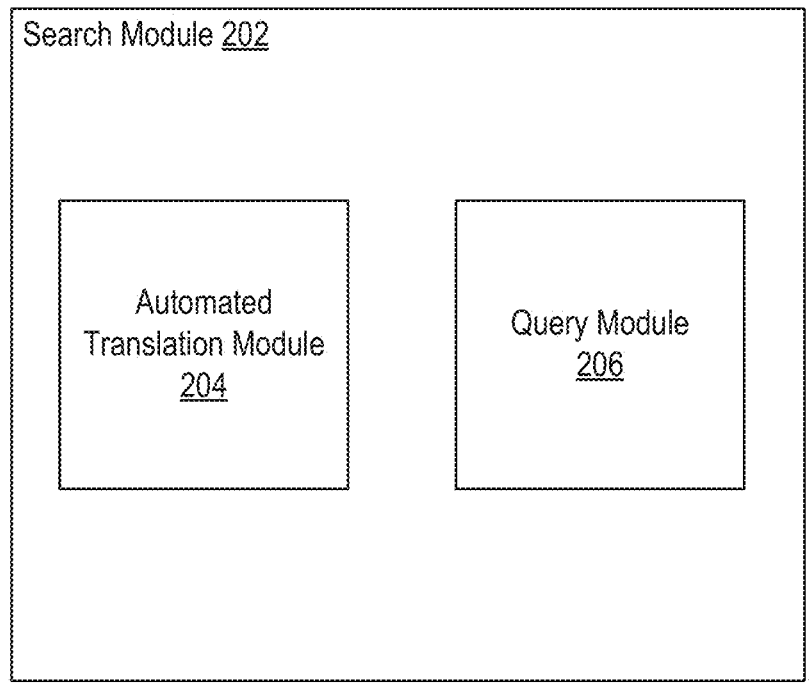
FIG. 2 illustrates an example of a search module, according to an embodiment of the present disclosure.

FIG. 2 illustrates an example search module 202, according to an embodiment of the present disclosure. In some embodiments, the search module 106 of FIG. 1 can be implemented as the example search module 202. As shown in FIG. 2, the search module 202 can include an automated translation module 204 and a query module 206.

The social networking system can make emojis available to users of the social networking system. Each emoji can have a corresponding original language. The social networking system can assign emojis sharing a common original language to an emoji pool associated with the original language. The original languages of the emojis can be any languages, such as English, Hindi, German, Japanese, etc. The social networking system can assign the emojis to emoji pools according to original languages.

The automated translation module 204 can be configured to translate query text of a particular language. For each emoji pool associated with an original language which differs from a language of the query text, the automated translation module 204 can perform automated translation to translate the query text into the language of the emoji pool. In an illustration, suppose that the query text is in English; the automated translation can translate the query text into German and Japanese.

In some embodiments, the automated translation can generate a value which indicates translation quality. As an example, the value can convey decreased quality where a word of the query text does not have a direct equivalent word in a language into which the word is being translated. As one example, assume five words in Urdu which generally map to the English word "happy," each Urdu word conveying a different degree of happiness. The value can convey decreased quality where query text includes a word of the five Urdu words, and where the language of an emoji pool to which the word is translated is English. The value can also convey decreased quality where query text includes the English word "happy," and where the language of an emoji pool to which the word is translated is Urdu.

The query module 206 can be configured to perform a query for emojis using the query text. The query can be any suitable type of query, such as a Boolean query as just one example. The query module 206 can perform the query with respect to each of the emoji pools. The query can return a collection of emojis which includes results of the query for each of the emoji pools. A given emoji pool can be associated with a language which matches a language of the query text. The results of the query for the emoji pool can be a quantity of emojis having text labels which satisfy or otherwise match the query text to a threshold degree. A given emoji pool can be associated with a language which does not match a language of the query text. The results of the query for the emoji pool can be a quantity of emojis having text labels which satisfy or otherwise match an automated translation of the query text to a threshold degree. The query can, as an illustration, make use of stemming. The query can, as another illustration, utilize synonym expansion. In some embodiments, in addition to text labels of emojis, the query can be applied to pools of subtitles/captions, titles, superimposed text, hashtags, or comments to determine matches between them and the translated query text.

Figure 3:
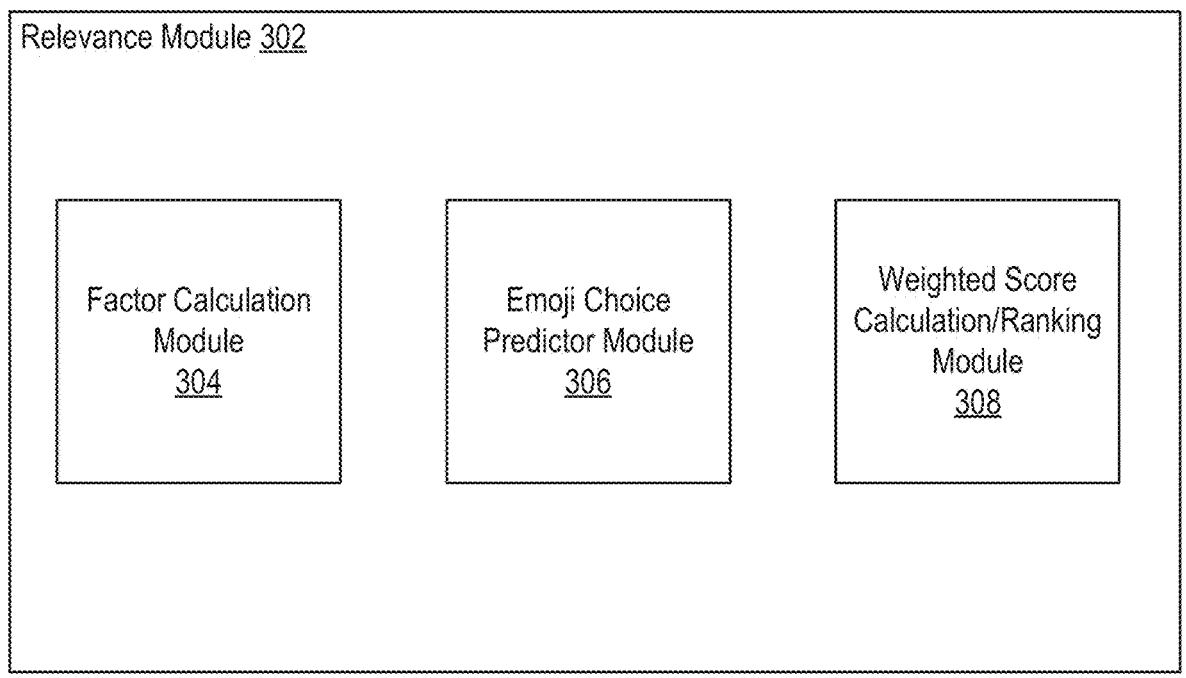
FIG. 3 illustrates an example of a relevance module, according to an embodiment of the present disclosure.

FIG. 3 illustrates an example relevance module 302, according to an embodiment of the present disclosure. In some embodiments, the relevance module 108 of FIG. 1 can be implemented as the example relevance module 302. As shown in FIG. 3, the relevance module 302 can include a factor calculation module 304, an emoji choice predictor module 306, and a weighted score calculation/ranking module 308.

The factor calculation module 304 can be configured to calculate values for a plurality of factors. As discussed herein, factor values can be provided as inputs to a machine learning model. The machine learning model can return a likelihood that a user will select a given emoji. As also discussed herein, factor values can be used in calculating a weighted score for an emoji.

The factor calculation module 304 can calculate the values for the plurality of factors for each emoji of the collection of emojis. The factors can include one or more of a meaning relevance factor, a language correlation factor, an interaction history factor, a translation quality factor, a purity level factor, and a language relevance factor. The factors can have quantitative values. In some embodiments, the values of the factors can be generated or determined based on a common value scale to facilitate comparisons between values for different factors. Text labels are discussed below in connection with calculation of values for the factors. The discussion of text labels below is also applicable to subtitles/captions, titles, superimposed text, hashtags, and comments.

The meaning relevance factor can quantify, for an emoji of the collection of emojis, a similarity between the query text and a text label of the emoji. In some embodiments, a value of the meaning relevance factor can be proportional to the similarity between the query text and the text label of the emoji. In some embodiments, calculation of the meaning relevance factor value can include a term frequency—inverse document frequency (tf-idf) determination. The tf-idf calculation can be performed with respect to the query text, the text label of the emoji, and a corpus of the text labels of a multitude of emojis. As one example, the corpus can be the text labels of all of the emojis made available to the users of the social networking system. As another example, the corpus can be the text labels of the emojis assigned to an emoji pool to which the emoji of the collection has also been assigned. In some implementations, the similarity can be between the query text and subtitles/captions, titles, superimposed text, hashtags, or comments. A language of the query text can differ from a language of a text label of an emoji. In this situation, the automated translation module 204 can perform automated translation.

As one alternative, the automated translation can translate the query text to match the language of the text label of the emoji. As another alternative, the automated translation can translate the text label of the emoji to match a language of the query text.

The language correlation factor can quantify, for an emoji of the collection of emojis, a level of language prominence. The level (or value) of language prominence can be associated with an original language of the emoji and default languages of social network connections of the user. The default language of a user can, in some embodiments, be a language in which an interface of the social networking system is displayed to the user. Calculation of a value for the language correlation factor can include a determination of the quantity of the social network connections of the user whose default language is the same as the original language of the emoji.

As an example, assume that a user has thirty social network connections whose default language is English, ten social network connections whose default language is Japanese, and zero social network connections whose default language is Spanish. A first emoji can have an original language of English, a second emoji can have an original language of Japanese, and a third emoji can have an original language of Spanish. A value for the language correlation factor can be calculated with respect to each of the first emoji, the second emoji, and the third emoji. The value calculated for the first emoji can have the highest relative value; the value calculated for the second emoji can have the second highest relative value; and the value calculated for the third emoji can have the lowest relative value.

The interaction history factor can quantify, for an emoji of the collection of emojis, an extent to which the user has sent or received the emoji. In some embodiments, a value of the interaction history factor can increase if the user has sent or received the emoji. For example, calculation of a value for the interaction history factor can include computing a sum. The addends of the sum can be a quantity of times the user sent the emoji, and a quantity of times the user received the emoji.

The translation quality factor can reflect, for an emoji of the collection of emojis, one or more translation quality values generated by the search module 202 for the emoji. Calculation of a value for the translation quality factor can, in one embodiment, include computing an average of one or more translation quality values generated when translating the query text.

As an example, assume that an emoji belongs to an Urdu emoji pool, and that a user provides English query text of "happy son." Assume further that the search module 202 generates a first translation quality value in connection with translating "happy" to Urdu, and a second translation quality value in connection with translating "son" to Urdu. A value for the translation quality factor can be calculated as the average of the first translation quality value and the second translation quality value.

The purity level factor can quantify, for an emoji of the collection of emojis, an extent to which a text label of the emoji contains words which are not found in the query text. A value of the purity level factor can be proportional to the quantity of words of the text label, which are not found in the query text. In some embodiments, calculation of a value for the purity level factor can include counting instances of a word of the text label not being found in the query text. A language of the query text can differ from a language of a text label of the emoji. In this situation, the automated translation module 204 can perform automated translation.

In one instance, the automated translation can translate the query text to match the language of the text label of the emoji. In another instance, the automated translation can translate the text label of the emoji to match a language of the query text.

As an example, a first emoji can have a text label of "heavy," a second emoji can have a text label of "heavy metal," and the query text can be "heavy." A purity level factor value calculated for the second emoji can be lower than a purity level factor value calculated for the first emoji. As another example, a first picture can have a title of "hello word happy Friday," and a second picture can have a title of "hello." The query text can be "hello." A purity level factor value calculated for the second picture can be higher than a purity level factor value calculated for the first picture.

The language relevance factor can quantify, for a picture or video of a collection of pictures or videos, a prominence of a default language of the user among data items of the picture or video. The data items can include subtitles/captions, titles, superimposed text, hashtags, and comments. Calculation of a value for the language relevance factor can include determining the quantity of data items which are of the default language of the user.

As an example, suppose that, for a picture or video, certain data items are in a default language of a user. Suppose further that the data items in the default language are one title, two hashtags, and three comments. In this example, calculation of a value for the language relevance factor can involve summing the quantities to produce a total of six.

As another example, suppose that a default language of a first user is Japanese, and that a default language of a second user is Spanish. Suppose further that a video has a single title, the single title being in English. Also suppose that the video has a single subtitle/caption set, the single subtitle/caption set being in Japanese. Additionally suppose that the video has twenty comments in Japanese and two comments in Spanish. A value for the language relevance factor can be calculated with respect to each of the first user and the second user. The value calculated for the first user can be higher than the value calculated for the second user.

The emoji choice predictor module 306 can be configured to predict, for each emoji of the collection of emojis, a likelihood that the user will select the emoji. The emoji choice predictor module 306 can predict the likelihood via a machine learning model. In some embodiments, the machine learning model can be based on any suitable technique, such as linear regression, a neural network, or another generally known approach The machine learning model can be trained to predict, based on inputted factors, a likelihood (or probability) of emoji selection. As discussed below, the machine learning model can be trained further after the user has selected an emoji.

The machine learning model can be trained based on training sets of data relating to emojis and their selection by users. The training sets can include, for each of one or more emojis of the training set, values for a plurality of factors calculated for the emoji. The values for the plurality of factors can be calculated for the emoji in the manner discussed herein. The training sets also can include, for each of the one or more emojis of the training set, an indication of whether or not the emoji was selected by a given user.

To predict the likelihood that the user will select a given emoji, the emoji choice predictor module 306 can provide, as inputs to the machine learning model, values for the plurality of factors calculated for the emoji. The machine learning model can return a predicted likelihood that the user will select the emoji. In an embodiment, the predicted likelihood can range from zero to 1.0, with increasing value indicating increased likelihood of emoji selection.

Once the user has selected an emoji of the collection of emojis, the machine learning model can be trained further. The emoji choice predictor module 306 can pass to the machine learning model a further training set. The further training set can include, for each of the one or more emojis presented to the user, the plurality of factors calculated for the emoji. The further training set also can include, for each of the one or more emojis presented to the user, an indication of whether or not the emoji was selected by the user. In this manner, the machine learning model can be refined over time.

The weighted score calculation/ranking module 308 can be configured to calculate, for each emoji of the collection of emojis, a weighted score and a rank value. Calculation of a weighted score for a given emoji can include computing a weighted sum over the plurality of factors calculated for the emoji. Applied to the sum can be a weight set to the predicted likelihood of the user selecting the emoji. In some embodiments, there can be calculation of a sum over the plurality of factors calculated for the emoji, but without application of weights reflecting predicted likelihoods of the user selecting the emoji. In such embodiments, a machine learning model need not be used. There can be many variations or other possibilities.

The calculation/ranking module 308 can order the emojis according to the weighted scores calculated for the emojis. The calculation/ranking module 308 can then assign each emoji a rank value which reflects an ordinal place of the emoji in the order. The emoji prediction module 110 can use the rank values in presenting the emojis to the user in a rank-ordered fashion.

As discussed above, the present disclosure discussed herein with respect to emojis can, in some embodiments, be applied in connection with pictures or videos. As an example, a first user and a second user can each desire to obtain an image found via an image search. The first user can provide query text in English, the query text being "Michael Phelps Olympic gold medal winner." The second user can provide query text in German, the query text being "Michael Phelps olympischer Goldmedaillengewinner." "Michael Phelps olympischer Goldmedaillengewinner" is the German equivalent of "Michael Phelps Olympic gold medal winner." Images of the social networking system can be considered as to one or more of titles, superimposed text, hashtags, and comments associated with the images. Despite the first user and the second user having searched using different languages, each user can receive a ranked indication of images relevant to the concept of "Michael Phelps Olympic gold medal winner." The images can include images having associated titles, superimposed text, hashtags, and/or comments in a plurality of languages.

As another example, a user can desire to obtain a video found via a video search. The user can provide query text in a native language of the user. Videos of the social networking system can be considered as to one or more of subtitles/captions, titles, superimposed text, hashtags, and comments associated with the videos. Despite the user having searched using a native language of the user, the user can receive a ranked indication of videos relevant to the concept of the query text. The videos can include videos having subtitles/captions, titles, superimposed text, hashtags, and/or comments which are in a plurality of languages.

Figure 4A:
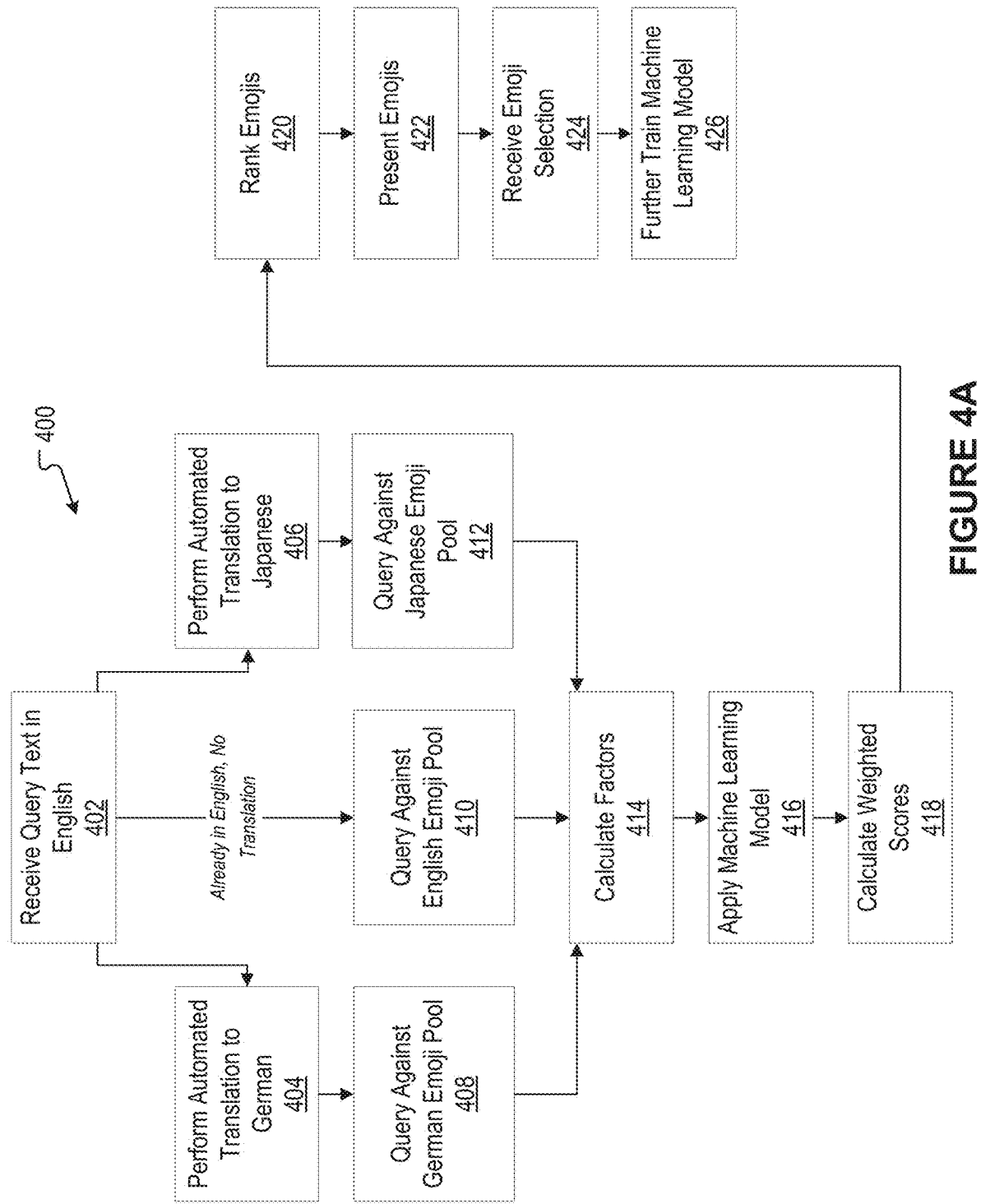
FIG. 4A illustrates an example functional block diagram, according to an embodiment of the present disclosure.

FIG. 4A illustrates an example functional block diagram 400, according to an embodiment of the present disclosure. The example functional block diagram 400 illustrates a sequence associated with performance of multilingual emoji search, according to an embodiment of the present disclosure. At block 402, query text can be received from a user seeking an emoji. The query text can be received by the query text module 104. In the example of FIG. 4A, the query text is in English. Also in the example of FIG. 4A, emojis available to users of the social networking system can be assigned, according to original language, to various emoji pools. There can be a first pool for emojis having an original language of German, a second pool for emojis having an original language of English, and a third pool for emojis having an original language of Japanese. While three original languages are shown, any number of fewer, additional, or alternative original languages are possible.

At block 404, the query text can be automatically translated into German, the language of the first emoji pool. At block 406, the query text can be automatically translated into Japanese, the language of the third emoji pool. Blocks 404 and 406 can be performed by the search module 106. As the query text is already in English, no automated translation is performed in view of the second emoji pool. At block 408, a query is performed for the query text with respect to the first emoji pool. The query is performed using a German translation of the query text produced at block 404. At block 410, a query is performed for the query text with respect to the second emoji pool. The query is performed using the query text without any translation applied thereto. At block 412, a query is performed for the query text with respect to the third emoji pool. The query is performed using a Japanese translation of the query text produced at block 406.

The query of block 408 can return emojis which have text labels which satisfy the German translation of the query text. The query of block 410 can return emojis which have text labels which satisfy the untranslated query text. The query of block 412 can return emojis which have text labels which satisfy the Japanese translation of the query text. Blocks 408-412 can be performed by the search module 106.

At block 414, a plurality of factor values can be calculated for each emoji returned by the query of block 408. Also at block 414, a plurality of factor values can be calculated for each emoji returned by the query of block 410. Further at block 414, a plurality of factor values can be calculated for each emoji returned by the query of block 412. Block 414 can be performed by the relevance module 108.

At block 416, a machine learning model can be applied. For each of the emojis returned via the queries of blocks 408-412, the factor values calculated at block 414 for the emoji can be provided to the machine learning model. A likelihood that the user will select the emoji can be returned by the machine learning model. Block 416 can be performed by the relevance module 108.

At block 418, a weighted score can be calculated for each of the emojis. The weighted score can be a weighted sum over the factor values calculated at block 414 for the emoji. Applied to the sum can be a weight equivalent to the predicted likelihood returned by the machine learning model for the emoji at block 416. At block 420, the emojis can be ranked using the weighted scores calculated at block 418. Blocks 418 and 420 can be performed by the relevance module 108.

At block 422, the emojis can be presented to the user in an order which reflects the ranking. At block 424, the user can select one of the emojis. As examples, the selected emoji can appear in a variety of content selected by the user, such as a post, message, or any other type of information shared by the user through the social networking system. Blocks 422 and 424 can be performed by the emoji presentation module 110.

At block 426, the machine learning model can be trained (retrained) further in view of the selected emoji and the unselected emojis. Block 426 can be performed by the relevance module 108.

Figure 4B:
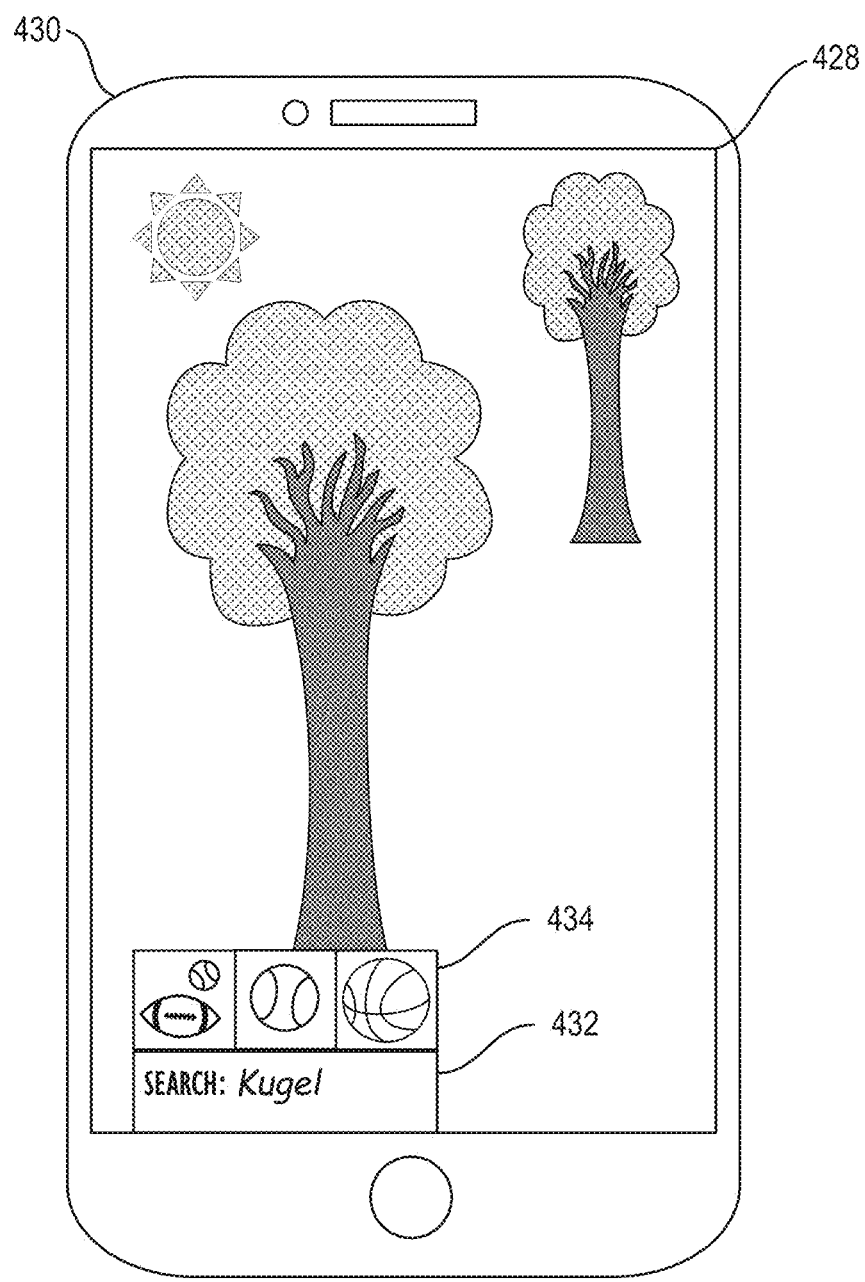
FIG. 4B illustrates an example interface, according to an embodiment of the present disclosure.

FIG. 4B illustrates an example of an interface 428, according to an embodiment of the present disclosure. The interface can be presented on the display of a computing device 430 of a user who desires to search for an emoji. The interface 428 can be provided through an application running on the computing device 430, such as an app or via a web browser.

The interface 428 can include a text entry region 432. The text entry region 432 can be used by the user to provide query text in connection with the search for the emoji. In the example, the user has entered "Kugel," the German word for "ball." In a different example, the user might submit query text in a language other than German. The interface 428 also can include a search result region 434. In the example, the search result region 434 displays emojis which are returned as results of the search. The emojis can include not only emojis which have an original language of German, but also emojis which have an original language of other than German. The user can use the search result region 434 to select one of the emojis. As examples, the selected emoji can be inserted in a post or in a message.

Figure 5:
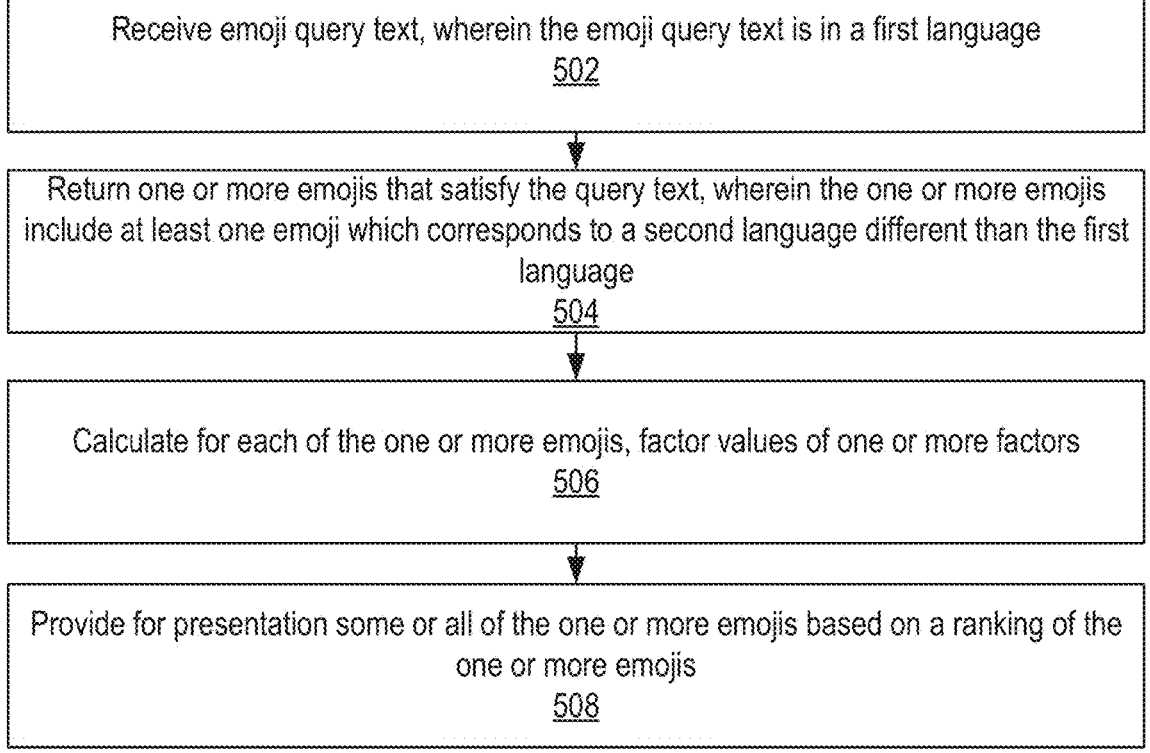
FIG. 5 illustrates an example process, according to an embodiment of the present disclosure.

FIG. 5 illustrates an example process 500, according to various embodiments of the present disclosure. It should be appreciated that there can be additional, fewer, or alternative steps performed in similar or alternative orders, or in parallel, within the scope of the various embodiments discussed herein unless otherwise stated.

At block 502, the example process 500 can receive emoji query text, wherein the emoji query text is in a first language. At block 504, the process can return one or more emojis that satisfy the query text, wherein the one or more emojis include at least one emoji which corresponds to a second language different than the first language.

Then, at block 506, the process can calculate for each of the one or more emojis, factor values of one or more factors. At block 508, the process can provide for presentation of some or all of the one or more emojis, wherein the presentation is based on a ranking of the one or more emojis.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
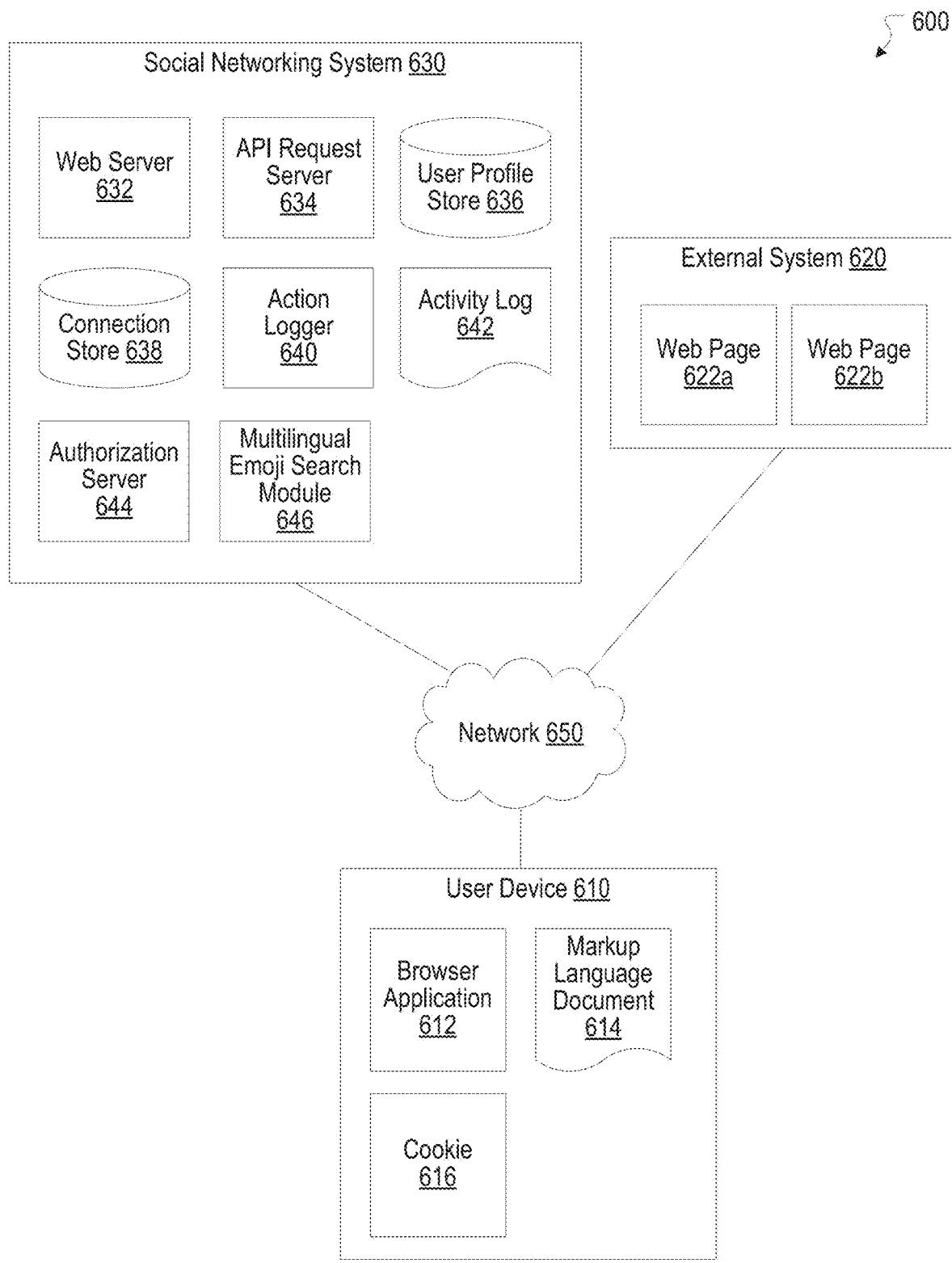
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), macOS, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects an other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes"

another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a multilingual emoji search module 646. The multilingual emoji search module 646 can, for example, be implemented as the multilingual emoji search module 102 of FIG. 1. As discussed previously, it should be appreciated that there can be many variations or other possibilities.

Hardware Implementation

Figure 7:
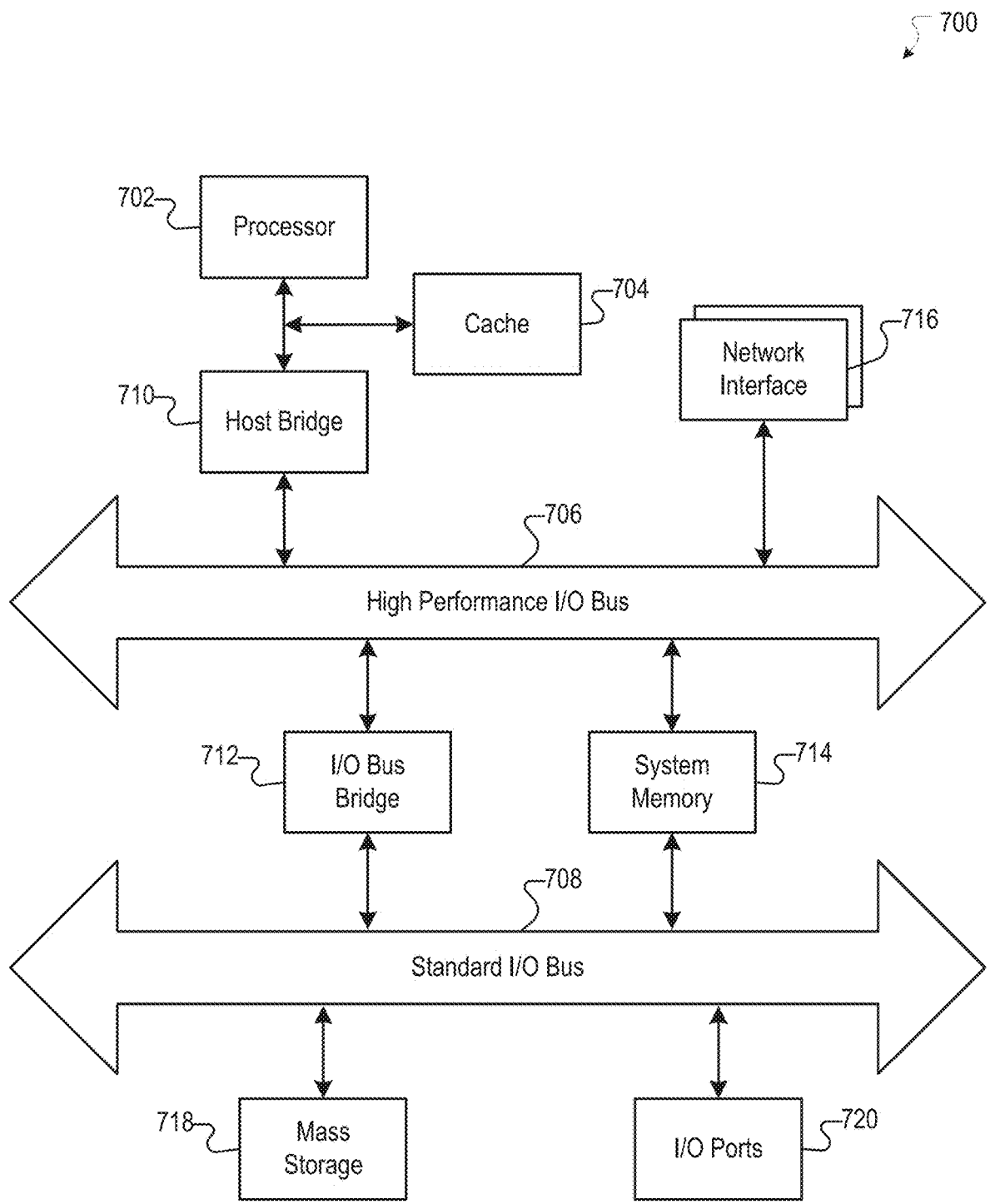
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing device, emoji query text, wherein the emoji query text is in a first language;
    returning, by the computing device, one or more emojis, each associated with one or more text labels that correspond to a second language different from the first language, based on the query text, wherein the one or more text labels do not correspond to the first language;
    calculating, by the computing device, for each of the one or more emojis, factor values of one or more factors, wherein the one or more factors include a purity level factor and wherein a purity level factor value of the purity level factor is proportional to a quantity of words in the emoji query text and a quantity of words in each of the one or more text labels; and
    providing, by the computing device, for presentation some or all of the one or more emojis based on a ranking of the one or more emojis.

2. The computer-implemented method of claim 1, wherein the ranking is based on the factor values.

3. The computer-implemented method of claim 1, further comprising:
    providing, by the computing device, to a machine learning model, the factor values for each of the one or more emojis; and
    receiving, by the computing device, from the machine learning model, a likelihood of user selection of the emoji.

4. The computer-implemented method of claim 3, wherein the ranking is based on likelihoods of user selection of the one or more emojis.

5. The computer-implemented method of claim 3, further comprising:
    receiving, by the computing device, user selection of one of the one or more emojis; and
    training, by the computing device, based on the user selection, the machine learning model.

6. The computer-implemented method of claim 1, wherein the one or more factors further include a language correlation factor, and wherein a language correlation factor value of the language correlation factor calculated for an emoji of the one or more emojis is based on a level of language prominence of a language to which the emoji corresponds relative to default languages of one or more social network connections of the user.

7. The computer-implemented method of claim 1, wherein the one or more factors further include an interaction history factor, and wherein an interaction history factor value of the interaction history factor calculated for an emoji of the one or more emojis quantifies an extent to which a user has sent or received the emoji.

8. The computer-implemented method of claim 1, wherein the one or more factors further include a translation quality factor, and wherein a translation quality factor value of the translation quality factor calculated for an emoji of the one or more emojis is based on an extent to which one or more words of the emoji query text have direct equivalent words in a language to which the emoji corresponds.

9. The computer-implemented method of claim 1, wherein the returning the one or more emojis comprises:
    performing a query against an emoji pool which corresponds to the second language; and
    performing a query against an emoji pool which corresponds to a third language.

10. The computer-implemented method of claim 1, wherein the text labels of the one or more emojis satisfy the query text.

11. A computer-implemented system comprising:
    at least one processor; and
    a memory storing instructions that, when executed by the at least one processor, cause the system to perform:
        receiving emoji query text, wherein the emoji query text is in a first language;
        returning one or more emojis, each associated with one or more text labels that correspond to a second language different from the first language, based on the query text, wherein the one or more text labels do not correspond to the first language;
        calculating for each of the one or more emojis, factor values of one or more factors, wherein the one or more factors include a purity level factor and wherein a purity level factor value of the purity level factor is proportional to a quantity of words in the emoji query text and a quantity of words in each of the one or more text labels; and providing for presentation some or all of the one or more emojis based on a ranking of the one or more emojis.

12. The system of claim 11, wherein the ranking is based on the factor values.

13. The system of claim 11, wherein the instructions, when executed by the at least one processor, further cause the system to perform:

providing to a machine learning model, the factor values for each of the one or more emojis; and receiving from the machine learning model, a likelihood of user selection of the emoji.

14. The system of claim 13, wherein the ranking is based on likelihoods of user selection of the one or more emojis.

15. The system of claim 13, wherein the instructions, when executed by the at least one processor, further cause the system to perform:

receiving user selection of one of the one or more emojis; and training based on the user selection, the machine learning model.

16. A non-transitory computer-readable storage medium including instructions that, when executed by at least one processor of a computing system, cause the computing system to perform a method comprising:

receiving emoji query text, wherein the emoji query text is in a first language;

returning one or more emojis, each associated with one or more text labels that correspond to a second language different than the first language, based on the query text, wherein the one or more text labels do not correspond to the first language;

calculating for each of the one or more emojis, factor values of one or more factors, wherein the one or more factors include a purity level factor and wherein a purity level factor value of the purity level factor is proportional to a quantity of words in the emoji query text and a quantity of words in each of the one or more text labels; and providing for presentation some or all of the one or more emojis based on a ranking of the one or more emojis.

17. The non-transitory computer-readable storage medium of claim 16, wherein the ranking is based on the factor values.

18. The non-transitory computer-readable storage medium of claim 16, wherein the instructions, when executed by the at least one processor of the computing system, further cause the computing system to perform:

providing to a machine learning model, the factor values for each of the one or more emojis; and receiving from the machine learning model, a likelihood of user selection of the emoji.

19. The non-transitory computer-readable storage medium of claim 18, wherein the ranking is based on likelihoods of user selection of the one or more emojis.

20. The non-transitory computer-readable storage medium of claim 18, wherein the instructions, when executed by the at least one processor of the computing system, further cause the computing system to perform:

receiving user selection of one of the one or more emojis; and training based on the user selection, the machine learning model.

* * * * *